(12) United States Patent
Tischer

(10) Patent No.: US 8,626,493 B2
(45) Date of Patent: *Jan. 7, 2014

(54) INSERTION OF SOUNDS INTO AUDIO CONTENT ACCORDING TO PATTERN

(71) Applicant: AT&T Intellectual Property I, L.P., Atlanta, GA (US)

(72) Inventor: Steven N. Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,025

(22) Filed: Apr. 26, 2013

(65) Prior Publication Data

US 2013/0238342 A1 Sep. 12, 2013

Related U.S. Application Data

(63) Continuation of application No. 11/203,705, filed on Aug. 15, 2005, now Pat. No. 8,452,604.

(51) Int. Cl.
*G06F 15/00* (2006.01)
*G10L 25/00* (2013.01)
*G10L 21/00* (2013.01)
*G10L 21/06* (2013.01)

(52) U.S. Cl.
USPC ............ 704/200; 704/270; 704/276; 704/278

(58) Field of Classification Search
USPC .................................. 704/270, 276, 200, 278
See application file for complete search history.

(56) References Cited

U.S. PATENT DOCUMENTS

| 4,461,024 | A | | 7/1984 | Rengger et al. | |
|---|---|---|---|---|---|
| 5,204,905 | A | * | 4/1993 | Mitome | 704/260 |
| 5,220,681 | A | | 6/1993 | Belgin | |
| 5,751,885 | A | | 5/1998 | O'Loughlin et al. | |
| 5,918,213 | A | | 6/1999 | Bernard et al. | |
| 5,931,901 | A | * | 8/1999 | Wolfe et al. | 709/206 |
| 5,983,186 | A | | 11/1999 | Miyazawa et al. | |
| 6,088,123 | A | | 7/2000 | Adler et al. | |
| 6,181,743 | B1 | | 1/2001 | Bailleul | |
| 6,198,832 | B1 | | 3/2001 | Maes et al. | |
| 6,229,550 | B1 | | 5/2001 | Gloudemans et al. | |
| 6,252,971 | B1 | | 6/2001 | Wang | |
| 6,311,214 | B1 | | 10/2001 | Rhoads | |
| 6,332,123 | B1 | * | 12/2001 | Kaneko et al. | 704/276 |
| 6,359,573 | B1 | | 3/2002 | Taruguchi et al. | |
| 6,373,530 | B1 | | 4/2002 | Birks et al. | |
| 6,563,937 | B1 | * | 5/2003 | Wendt | 382/100 |
| 6,564,380 | B1 | | 5/2003 | Murphy | |
| 6,611,830 | B2 | | 8/2003 | Shinoda et al. | |
| 6,674,861 | B1 | | 1/2004 | Xu et al. | |
| 6,735,699 | B1 | | 5/2004 | Sasaki et al. | |
| 6,739,773 | B2 | | 5/2004 | Spano | |
| 6,748,237 | B1 | | 6/2004 | Bates et al. | |
| 6,771,794 | B1 | | 8/2004 | Osaka | |
| 6,839,673 | B1 | | 1/2005 | Choi et al. | |

(Continued)

*Primary Examiner* — Eric Yen
(74) *Attorney, Agent, or Firm* — Scott P. Zimmerman, PLLC

(57) ABSTRACT

Sounds are inserted into audio content according to a pattern. A library stores humanly perceptible voice sounds. Pattern control information is received that is associated with a device recording the audio content. A pattern is retrieved and washing machine sounds are inserted into the audio content according to the pattern. The humanly perceptible voice sounds are inserted into the audio content according to the pattern to generate a signed audio recording.

14 Claims, 5 Drawing Sheets

(56) References Cited

U.S. PATENT DOCUMENTS

| | | |
|---|---|---|
| 6,868,229 B2 | 3/2005 | Balogh |
| 6,940,993 B2 | 9/2005 | Jones et al. |
| 6,975,746 B2 | 12/2005 | Davis et al. |
| 6,983,057 B1 | 1/2006 | Ho et al. |
| 6,996,533 B2 | 2/2006 | Ikeda et al. |
| 7,020,304 B2 | 3/2006 | Alattar et al. |
| 7,024,016 B2 | 4/2006 | Rhoads et al. |
| 7,068,297 B2 | 6/2006 | Jones et al. |
| 7,073,127 B2 | 7/2006 | Zhao et al. |
| 7,095,871 B2 | 8/2006 | Jones et al. |
| 7,110,566 B2 | 9/2006 | Pelly et al. |
| 7,190,808 B2 * | 3/2007 | Goldberg et al. .............. 382/100 |
| 7,206,820 B1 | 4/2007 | Rhoads et al. |
| 7,246,313 B2 | 7/2007 | Sung et al. |
| 7,280,970 B2 | 10/2007 | Tamir et al. |
| 7,302,162 B2 | 11/2007 | Beaton |
| 7,304,227 B2 | 12/2007 | Hoguchi |
| 7,305,468 B2 | 12/2007 | Douceur et al. |
| 7,373,513 B2 | 5/2008 | Levy |
| 7,443,982 B2 | 10/2008 | Stone et al. |
| 7,444,353 B1 | 10/2008 | Chen et al. |
| 7,460,252 B2 | 12/2008 | Campbell et al. |
| 8,055,910 B2 | 11/2011 | Kocher et al. |
| 2001/0002931 A1 | 6/2001 | Maes et al. |
| 2002/0027994 A1 | 3/2002 | Katayama et al. |
| 2002/0033844 A1 | 3/2002 | Levy et al. |
| 2002/0080964 A1 | 6/2002 | Stone et al. |
| 2002/0129255 A1 | 9/2002 | Tsuchiyama et al. |
| 2004/0166873 A1 | 8/2004 | Simic et al. |
| 2004/0236574 A1 | 11/2004 | Ativanichayaphong et al. |

\* cited by examiner

INSERTION OF SOUNDS INTO AUDIO CONTENT ACCORDING TO PATTERN

CROSS-REFERENCE TO RELATED APPLICATION

This application is a continuation of U.S. application Ser. No. 11/203,750, filed Aug. 15, 2005, now issued as U.S. Pat. No. 8,452,604 and incorporated herein by reference in its entirety.

BACKGROUND OF THE INVENTION

Recent years have witnessed the proliferation of personal media creation and distribution, such as audio podcasting, web logs ("blogs"), RSS (Really Simple Syndication) feeds, web cameras, and the like. With the expanding range of distribution possibilities for such content, the ability to determine and ascertain ownership of content may become more problematic. For example, such content may be edited, re-recorded, sampled or otherwise processed, which may make it difficult to determine the origin of the content.

One way to manage content distribution is to restrict access to it. For example, several techniques for digital rights management (DRM) have been developed to prevent unauthorized use of content. DRM is used, for example, by digital media publishers to allow them to control the duplication and dissemination of their proprietary content. Potential problems of DRM include potential vulnerability to attacks and overprotection of content by preventing "fair use." In addition, DRM may not be particularly useful or desirable, as an individual content creator may lack the ability to institute DRM measures, and access limitations generally run counter to the paradigm of free distribution of content among individuals.

Schemes exist for the digital watermarking of content, such as JPEG images or video files. Some conventional visual watermarking techniques, for example, embed identifying data within a compressed image or video file. Typically, the embedding is done in a manner that minimizes the creation of visual artifacts when an image is generated from the compressed file. While such techniques may be effective in maintaining the identity of content, they may be limited in their applicability.

SUMMARY OF THE INVENTION

Some embodiments of the present invention provide methods of identifying audio and/or visual content. Recognizable visual and/or audio artifacts, such as recognizable sounds, are introduced into visual and/or audio content in an identifying pattern to generate a signed visual and/or audio recording for distribution over a digital communications medium. A library of images and/or sounds may be provided, and the image and/or sounds from the library may be selectively inserted to generate the identifying pattern. The images and/or sounds may be inserted responsive to one or more parameters associated with creation of the visual and/or audio content. For example, the images and/or sounds may be inserted responsive to a personal identifier, a personal characteristic, a location descriptor, a temporal metric, a device identifier and/or an ambient environment parameter. A representation of the identifying pattern may be generated and stored in a repository, e.g., an independent repository configured to maintain creative rights information. The stored pattern may be retrieved from the repository and compared to an unidentified visual and/or audio recording to determine an identity thereof.

Additional embodiments of the present invention provide systems for identifying audio and/or visual content. A system includes a signature generator configured to introduce recognizable visual and/or audio artifacts into visual and/or audio content in an identifying pattern to generate a signed visual and/or audio recording for distribution over a digital communications medium. The system may further include a library of images and/or sounds, and the signature generator may be configured to selectively insert the image and/or sounds from the library to generate the identifying pattern. For example, the signature generator may be configured to insert the images and/or sounds responsive to one or more parameters associated with creation of the visual and/or audio content. The signature generator may be further configured to generate a representation of the identifying pattern for storage in a repository.

In additional embodiments of the present invention, computer program products for identifying audio and/or visual content are provided. A computer program product may include computer program code embodied in a storage medium, the computer program code including program code configured to introduce recognizable visual and/or audio artifacts into visual and/or audio content in an identifying pattern to generate a signed visual and/or audio recording for distribution over a digital communications medium. The program code configured to introduce recognizable visual and/or audio artifacts into visual and/or audio content in an identifying pattern to generate a signed visual and/or audio recording for distribution over a digital communications medium may include program code configured to instantiate a library of images and/or sounds and program code configured to selectively insert images and/or sounds from the library to generate the identifying pattern. For example, the program code configured to selectively insert images and/or sounds from the library to generate the identifying pattern may include program code configured to insert the images and/or sounds responsive to one or more parameters associated with creation of the visual and/or audio content. The computer program code may further include program code configured to generate a representation of the identifying pattern for storage in a repository

DETAILED DESCRIPTION OF EMBODIMENTS OF THE PRESENT INVENTION

Figure 1:
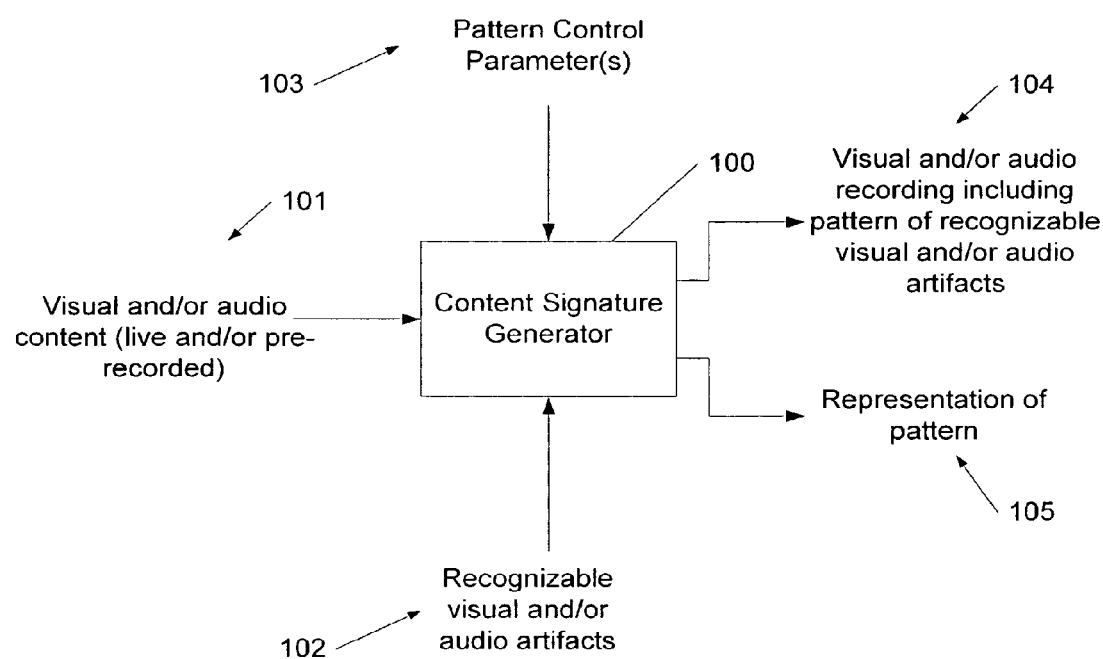
FIG. 1 is a schematic block diagram illustrating a content signature generator and exemplary operations thereof according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated selectivity features, integers, steps, operations, elements, and/or components, but do not preclude the presence or addition of one or more other selectivity features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or other illustrations of methods and/or systems according to embodiments of the invention. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

According to various exemplary embodiments of the present invention, media content, i.e., visual and/or audio content, may be "signed" by altering it in ways that may survive downstream alterations, such that it may be later processed to discover, for example, the identity of the originator and/or owner of the content. In some embodiments, recognizable additional content (e.g., sounds) may be inserted into the content according to identifying pattern (e.g., a periodic, aperiodic, pseudorandom or other identifiable pattern), and a separate representation of the pattern may be generated and stored for use in later identification processes. The additional content may be contextual, i.e., content consistent with the content being signed, and/or the additional content may be non-contextual, such as out-of-place sounds and/or imagery. The stored representation may be used, for example, to facilitate search and discovery of the origin of the content by allowing the matching of specific items not otherwise obvious in the instantiation.

For example, a person generating a recording of a story for a podcast may introduce recognizable audio artifacts, e.g., fake background noises and/or audio effects, such as fade-outs, static or echoes, according to a pattern. The pattern may be based on, for example, characteristics of the person creating the record, the device making the recording and/or parameters associated with the environment in which the recording was made. The signature could be later be detected to determine, for example, the origin of particular content, even if it has been re-recorded and incorporated into other content as if it were the work of someone else.

FIG. 1 illustrates a content signature generator 100 and exemplary operations thereof according to some embodiments of the present invention. The content signature generator 100 is configured to insert recognizable visual and/or audio artifacts 102 into visual and/or audio content 101 according to pattern control information 103, producing a visual and/or audio recording 104 that includes an identifying pattern of recognizable visual and/or audio artifacts. The content signal generator 100 is further operative to produce a separate representation 105 of the identifying pattern, which may be provided, for example, to a repository of rights information. It will be understood that the artifacts 102 may be contextual and/or non-contextual, and the pattern may have a periodic, aperiodic, pseudorandom or other character. For example, the pattern could be a periodic pattern of discrete, individually humanly perceptible artifacts or a "burst" of multiple artifacts that may be perceived by a human as a single perceptual event.

Figure 2:
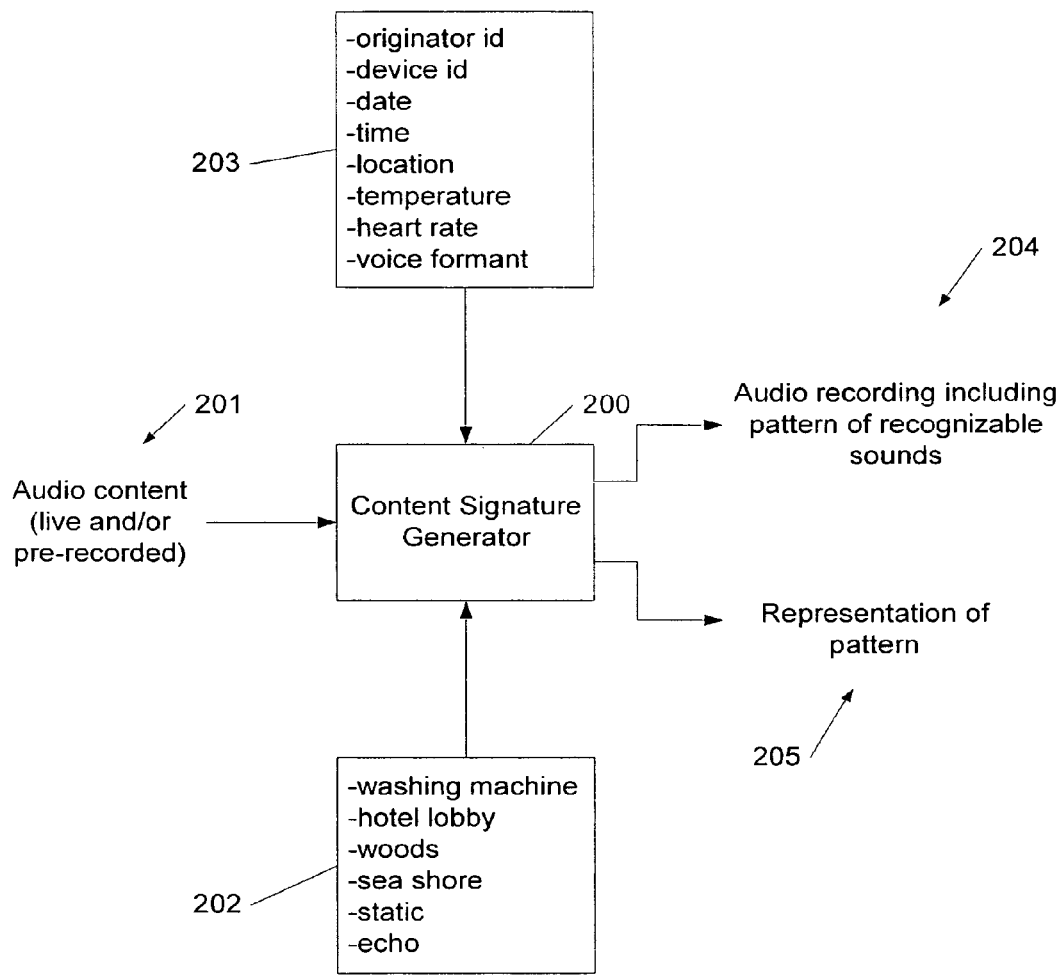
FIG. 2 is a schematic block diagram illustrating exemplary operations for inserting recognizable audio artifacts into audio content according to some embodiments of the present invention.

FIG. 2 illustrates a content signature generator 200 and exemplary operations thereof according to further embodiments of the present invention. The content signature generator 200 is configured to insert audio artifacts in the form of various commonly recognized sounds 202, such as those associated with a washing machine, hotel lobby, office, woods, or sea shore, and/or or commonly recognized audio effects, such as static or echoes, into source audio content 201. It will be understood that the sounds 202 may be consistent with the context of the source audio content 201 and/or may be non-contextual. The source audio content 201 may be, for example, a live input (e.g. a microphone or mixer feed) and/or pre-recorded audio content. The sounds 202 are inserted in the source audio content in a pattern based on pattern control information 203 associated with an originator of the content, e.g., the originator's name or other identifier, an identifier for a device used in creating the content, a date, time, or location, and/or a characteristic of a source of the content, e.g., a voice formant. The content signature generator 200 thus produces a "signed" audio recording 204 including the pattern of inserted sounds. The signed audio recording 204 may subsequently distributed over a communications medium, e.g., transmitted over the Internet, stored on a recording medium, or the like. The content signature generator 200 also generates a representation 205 of the audio content pattern, which may be transmitted, for example, to a repository of creative rights information, as described below with reference to FIG. 5.

Figure 3:
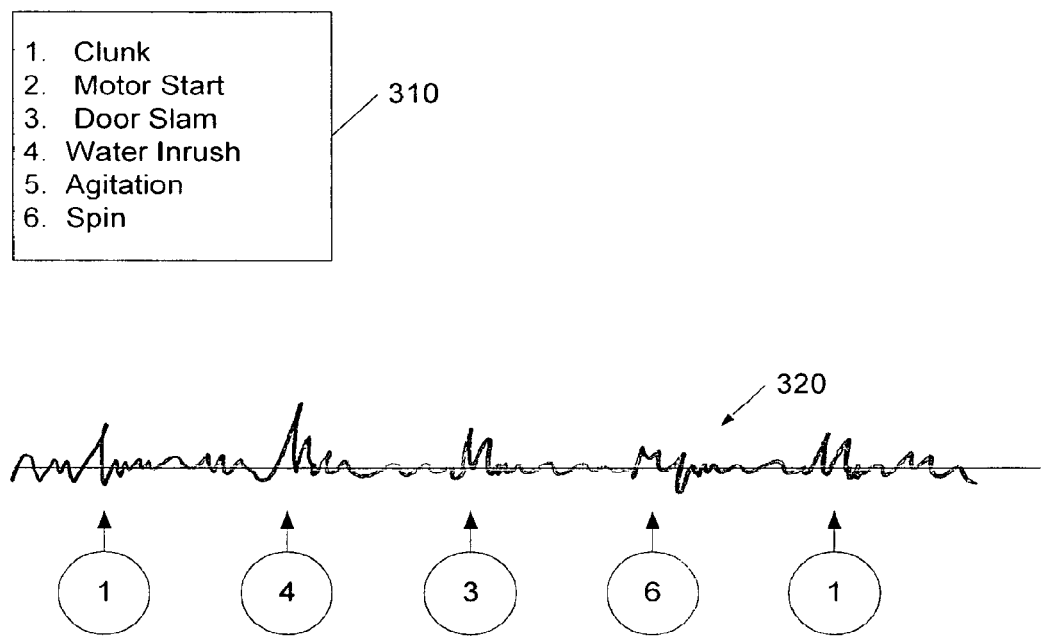
FIG. 3 is a signal diagram illustrating exemplary operations for inserting recognizable audio artifacts into audio content according to further embodiments of the present invention.

FIG. 3 illustrates exemplary operations for insertion of sound artifacts according to further embodiments of the present invention. A library 310 of predetermined sounds associated with a particular commonly recognized scene or environment, e.g., a laundry room, may be provided. As shown, several discrete sounds may be associated with such an environment, e.g., a "clunk" associated with a washing machine solenoid operation, a start of a motor, a slam of a door, an inrush of water, and the like. Sounds from the library 310 may be selectively inserted into an audio feed to according to a pattern to produce a "signed" audio recording 320.

It will be understood that the present invention is not limited to insertion of "environmental" sound sets, such as those described above with reference to FIGS. 2 and 3. For example, in some embodiments, an identifying pattern of utterances arranged into phrases. The utterances could be from a library of utterances associated with a particular individual, such as the "voice files" described in Published U.S. Patent Application No. 2004/0111271 to Tischer (U.S. patent application Ser. No. 10/012,946, filed Dec. 10, 2001).

Figure 4:
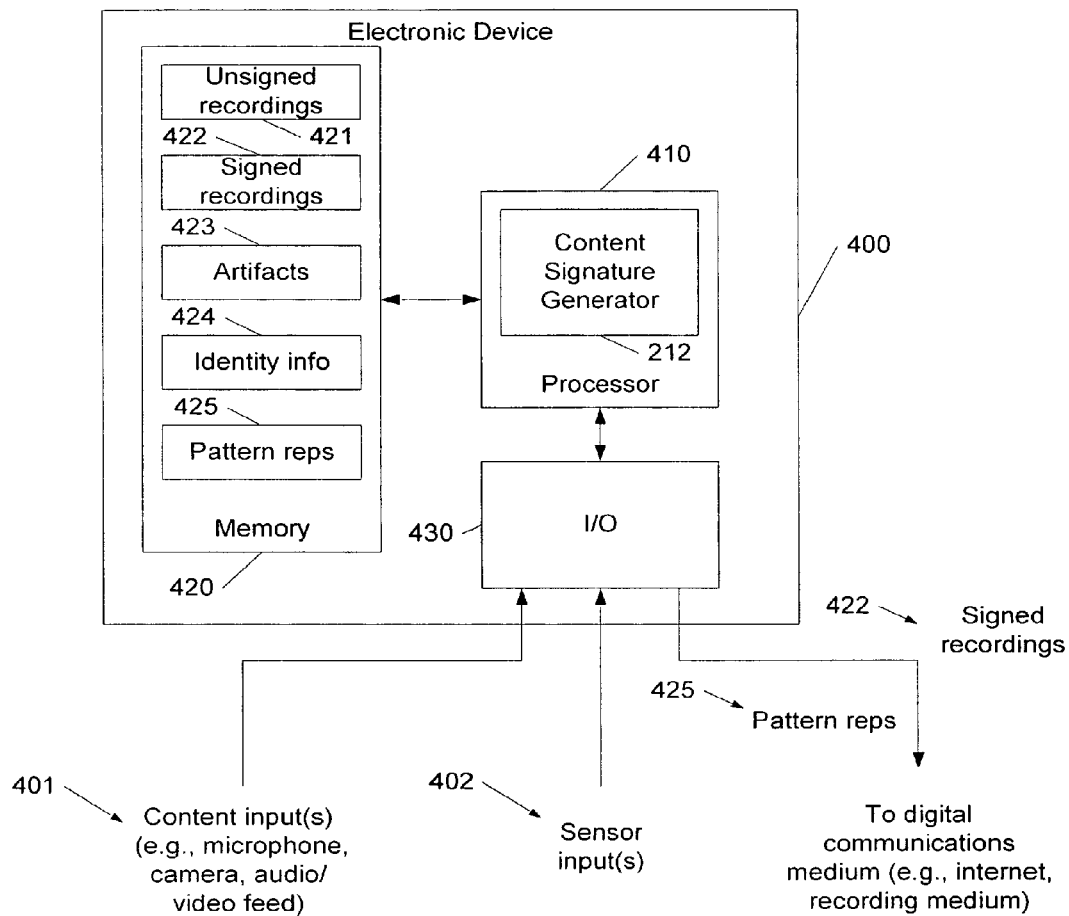
FIG. 4 is a schematic block diagrams illustrating an exemplary electronic device including a content signature generator according to some embodiments of the present invention.

FIG. 4 illustrates an exemplary implementation of content signatures in an electronic device 400, such as a personal computer, notebook computer, personal digital assistant (PDA), media recorder, wireless communications device (e.g., cell phone) or the like. A content signature generator 412 may be instantiated in the device 400 using program code configured to execute on a processor 410, e.g., a microprocessor, microcontroller or the like. The processor 410 interoperates with a memory 420, for example, semiconductor memory, magnetic storage and/or optical storage, and with input/output (I/O) circuitry 430. The memory 420 may be used, for example, to store an artifact library 423 (e.g., a repository of MPEG or WAV files), and identity information 424, such as an identifier for the device 400 and/or a user of the device 400, for use in generation of signed recordings by the content signature generator 412. As shown, content to be "signed" by the content signature generator 412 may include unsigned recordings 421 stored in the memory 420 and/or content 401 provided to the processor 430 via the I/O circuitry 430. The I/O circuitry 430 may also receive sensor inputs 402 for use by the content signature generator 412. Signed recordings 422 may be stored in the memory 420 and/or transmitted to a communications medium via the I/O circuitry 430. Representations 425 of patterns of artifacts introduced into the signed recordings 422 may also be stored in the memory 420 and/or transmitted to a communications medium via the I/O circuitry 430.

Figure 5:
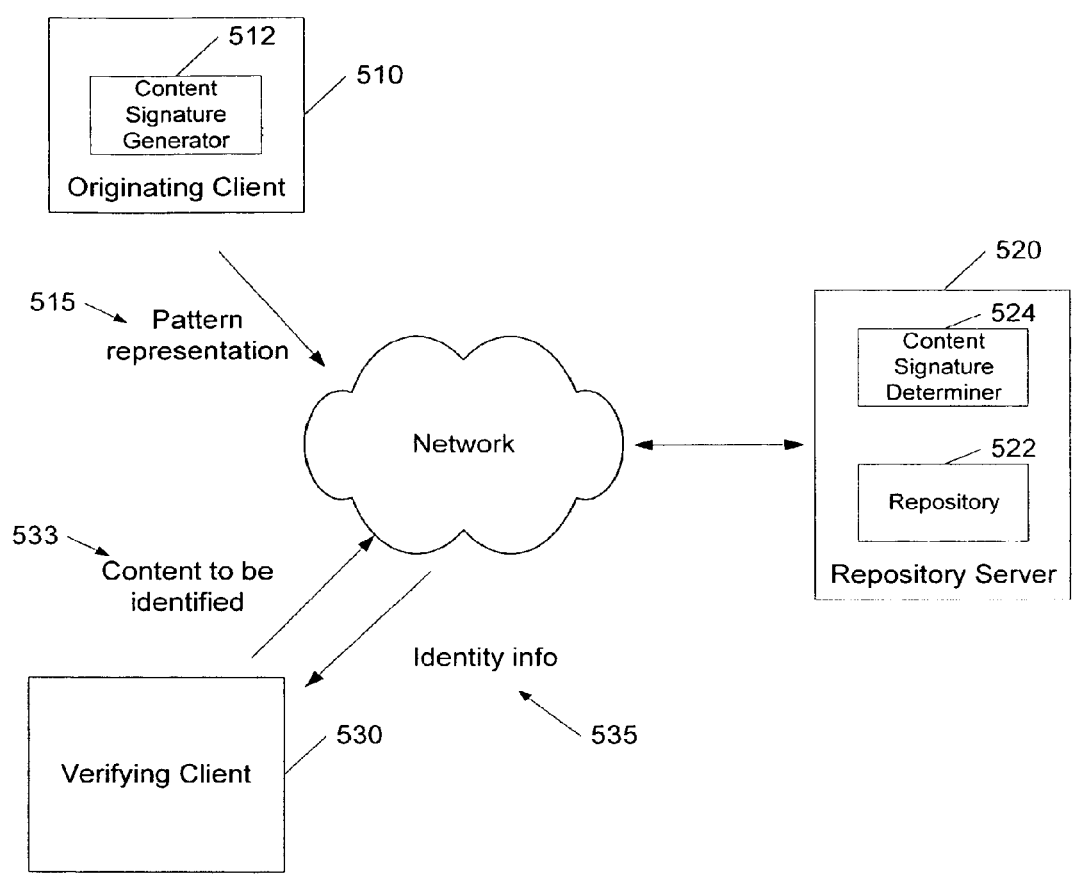
FIG. 5 is a schematic block diagram illustrating a client-server arrangement for a content signature information storage and retrieval according to some embodiments of the present invention.

FIG. 5 illustrates a client-server configuration for distributing content pattern representations according to further embodiments of the present invention. At an originating client 510, a content signature generator 512 generates representations 515 of patterns of visual and/or audio artifacts introduced into content recordings. The representations 515 are transmitted to a repository 522 at a repository server 520 via a network 540.

The repository 522 may be, for example, a database of patterns maintained by an independent party that administers or maintains creative rights information, such that parties wishing to include received content in their works may inquire as to the origin of the content. For example, an inquiring client 530 wishing to identify the origin of particular content 533 may, for example, transmit the content 533 to the repository server 520 over the network 540. As shown, the repository server 520 may include a content signature determiner 524 that is configured to determine if the content 533 includes a pattern of recognizable artifacts stored in the repository 522, and to provide identity info 535 to the inquiring client 530 upon detection of a match.

It will be appreciated that the implementation shown in FIG. 5 is provided for purposes of illustration, and that content signature information storage and distribution may be implemented in any of a number of different ways in various embodiments of the present invention. For example, in some embodiments, the repository 522 may be distributed across multiple nodes that communicate with the server 520. In further embodiments, the content signature determiner 524 may be positioned at inquiring client 530 (or other node), and may retrieve pattern information from the repository server 520 to make comparisons at the client 530.

In the drawings and specification, there have been disclosed exemplary embodiments of the invention. Although specific terms are employed, they are used in a generic and descriptive sense only and not for purposes of limitation, the scope of the invention being defined by the following claims.

The invention claimed is:

1. A method of identifying audio content, comprising:
storing in memory a library of humanly perceptible voice sounds;
receiving, by a processor, pattern control information associated with a device recording the audio content;
retrieving a pattern from the memory that is associated with the pattern control information;
inserting, by the processor, washing machine sounds into the audio content according to the pattern;
retrieving humanly perceptible voice sounds from the library of humanly perceptible voice sounds; and
inserting, by the processor, the humanly perceptible voice sounds into the audio content according to the pattern to generate a signed audio recording for distribution over a digital communications medium.

2. The method according to claim 1, further comprising querying the library of humanly perceptible voice sounds.

3. The method according to claim 1, further comprising receiving a location of the device recording the audio content.

4. The method according to claim 3, further comprising querying for the location of the device recording the audio content.

5. The method according to claim 1, further comprising retrieving a name of a person generating the signed audio recording.

6. A system for identifying audio content, the system comprising:
a processor; and
memory storing code that when executed causes the processor to perform operations, the operations comprising:
storing a library of humanly perceptible voice sounds;
receiving pattern control information associated with a device recording the audio content;
retrieving a pattern that is associated with the pattern control information;
inserting washing machine sounds into the audio content according to the pattern;
retrieving humanly perceptible voice sounds from the library of humanly perceptible voice sounds; and
inserting the humanly perceptible voice sounds into the audio content according to the pattern to generate a signed audio recording for distribution over a digital communications medium.

7. The system according to claim 6, wherein the operations further comprise querying the library of humanly perceptible voice sounds.

8. The system according to claim 6, wherein the operations further comprise receiving a location of the device recording the audio content.

9. The system according to claim 8, wherein the operations further comprise querying for the location of the device recording the audio content.

10. The system according to claim 6, wherein the operations further comprise retrieving a name of a person generating the signed audio recording.

11. A memory storing program code that when executed causes a processor to perform operations, the operations comprising:
- storing a library of humanly perceptible voice sounds;
- receiving pattern control information associated with a device recording the audio content;
- retrieving a pattern that is associated with the pattern control information;
- inserting washing machine sounds into the audio content according to the pattern;
- retrieving humanly perceptible voice sounds from the library of humanly perceptible voice sounds; and
- inserting the humanly perceptible voice sounds into the audio content according to the pattern to generate a signed audio recording for distribution over a digital communications medium.

12. The memory according to claim 11, wherein the operations further comprise querying the library of humanly perceptible voice sounds.

13. The memory according to claim 11, wherein the operations further comprise receiving a location of the device recording the audio content.

14. The memory according to claim 13, wherein the operations further comprise querying for the location of the device recording the audio content.

* * * * *